(12) United States Patent
Glejbol

(10) Patent No.: US 10,197,198 B2
(45) Date of Patent: Feb. 5, 2019

(54) FLEXIBLE PIPE

(71) Applicant: National Oilwell Varco Denmark I/S, Brondby (DK)

(72) Inventor: Kristian Glejbol, Glostrup (DK)

(73) Assignee: NATIONAL OILWELL VARCO DENMARK I/S, Brøndby (DK)

( * ) Notice: Subject to any disclaimer, the term of this patent is extended or adjusted under 35 U.S.C. 154(b) by 195 days.

(21) Appl. No.: 15/127,090

(22) PCT Filed: Mar. 18, 2015

(86) PCT No.: PCT/DK2015/050055
§ 371 (c)(1),
(2) Date: Sep. 19, 2016

(87) PCT Pub. No.: WO2015/139708
PCT Pub. Date: Sep. 24, 2015

(65) Prior Publication Data
US 2017/0114931 A1    Apr. 27, 2017

(30) Foreign Application Priority Data

Mar. 21, 2014 (DK) .................................. 2014 70139

(51) Int. Cl.
*F16L 9/14* (2006.01)
*F16L 11/08* (2006.01)
(52) U.S. Cl.
CPC .................................. *F16L 11/083* (2013.01)
(58) Field of Classification Search
CPC .................................................... F16L 11/083
(Continued)

(56) References Cited

U.S. PATENT DOCUMENTS

| 4,431,034 A | 2/1984 | Abdullaev et al. |
| 4,728,224 A | 3/1988 | Salama et al. |

(Continued)

FOREIGN PATENT DOCUMENTS

| EP | 0244048 | 1/1987 |
| FR | 2846395 | 4/2004 |

(Continued)

OTHER PUBLICATIONS

Search Report dated Oct. 9, 2014 for PA 2014 70139.
(Continued)

*Primary Examiner* — Patrick F Brinson
(74) *Attorney, Agent, or Firm* — Pearne & Gordon LLP

(57) ABSTRACT

The invention concerns a flexible pipe for offshore applications, such as for use as a riser in oil production. The flexible pipe has a longitudinal axis and contains a pressure resilient core pipe structure with an inner surface defining a bore, and at least a pair of cross wound and non-bonded tensile armor layers surrounding said core pipe structure. The pressure resilient core pipe structure contains an embedded pressure armor structure, wherein the embedded pressure armor structure contains a plurality of layers of helically wound continuous fibers, wound with a winding angle of about 60 degrees or more relative to the longitudinal axis of the pipe and embedded in a cured polymer matrix. The fibers are individually bonded to the cured polymer matrix. Preferably each of said layers of helically wound continuous fibers have a fiber density of at least about 40%.

20 Claims, 6 Drawing Sheets

(58) Field of Classification Search
USPC ........ 138/123–126, 140, 141, 137, 133, 134
See application file for complete search history.

(56) References Cited

U.S. PATENT DOCUMENTS

| | | | |
|---|---|---|---|
| 5,499,661 A | | 3/1996 | Odru et al. |
| 5,813,439 A | | 9/1998 | Herrero et al. |
| 6,165,586 A | | 12/2000 | Nouveau et al. |
| 6,363,974 B1 | | 4/2002 | Perez et al. |
| 6,550,502 B2 | | 4/2003 | Odru |
| 6,581,644 B1 | | 6/2003 | Monette et al. |
| 6,769,454 B2 | | 8/2004 | Fraser et al. |
| 6,978,806 B2 | | 12/2005 | Glejbol et al. |
| 7,124,780 B2 | | 10/2006 | Dupoiron |
| 7,842,149 B2 | | 11/2010 | Glejbol et al. |
| 7,923,126 B2 | | 4/2011 | Gudme |
| 7,987,875 B2 | | 8/2011 | Rytter |
| 8,505,587 B2 | | 8/2013 | Glejbol et al. |
| 8,960,239 B2 | | 2/2015 | Glejbol |
| 9,482,372 B2 | | 11/2016 | Glejbol |
| 2002/0157723 A1 | | 10/2002 | Odru |
| 2004/0066035 A1 | | 4/2004 | Buon et al. |
| 2010/0062202 A1 | | 3/2010 | Procida |
| 2010/0089481 A1 | | 4/2010 | Bectarte et al. |
| 2010/0326558 A1* | 12/2010 | Do ........................ | F16L 11/083 138/137 |
| 2011/0120583 A1 | | 5/2011 | Coutarel et al. |
| 2012/0273080 A1* | 11/2012 | Glejbol ................ | F16L 11/083 138/137 |
| 2012/0279575 A1* | 11/2012 | Tronc .................... | F16L 11/083 137/1 |
| 2013/0014849 A1* | 1/2013 | Glejbol ................ | F16L 11/083 138/137 |
| 2013/0112308 A1* | 5/2013 | Glejbol ................ | F16L 11/083 138/137 |
| 2014/0076450 A1 | | 3/2014 | Glejbol |
| 2014/0124078 A1 | | 5/2014 | Glejbol et al. |
| 2014/0158247 A1 | | 6/2014 | Kristiansen |
| 2014/0230946 A1 | | 8/2014 | Procida et al. |
| 2014/0305532 A1 | | 10/2014 | Glejbol |
| 2015/0027580 A1* | 1/2015 | Glejbol ................ | F16L 11/083 138/132 |
| 2015/0060589 A1 | | 3/2015 | Glejbol |
| 2015/0368982 A1 | | 12/2015 | Cappeln et al. |

FOREIGN PATENT DOCUMENTS

| | | |
|---|---|---|
| FR | 2904993 A1 | 8/2006 |
| WO | 0151839 | 7/2001 |
| WO | 2006097112 | 9/2006 |
| WO | 2011072688 | 6/2011 |
| WO | 2012006998 | 1/2012 |
| WO | 2013044920 | 4/2012 |
| WO | 2012149937 | 11/2012 |
| WO | 2012152282 | 11/2012 |
| WO | 2012155910 | 11/2012 |
| WO | 2013/071935 A1 | 5/2013 |
| WO | 2013/152770 A1 | 10/2013 |
| WO | 2013/182196 A1 | 12/2013 |
| WO | 2014117780 | 8/2014 |

OTHER PUBLICATIONS

"Specification for Unbonded Flexible Pipe", ANSI/API 17J, Third edition, Jul. 2008.
"Recommended Practice for Flexible Pipe", ANSI/API 17 B, fourth Edition, Jul. 2008.
"Specification for Bonded Flexible Pipe" Mar. 1, 2002.
International Search Report dated Apr. 23, 2015 for PCT/DK2015/050055.
Extended European Search Report for 15 76 5725 dated Dec. 12, 2017.

* cited by examiner

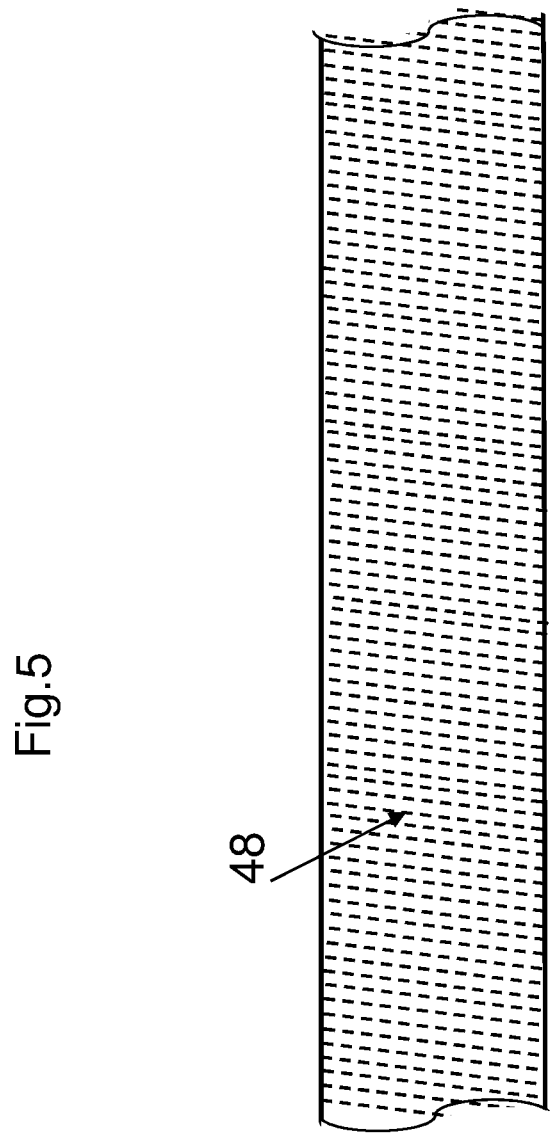

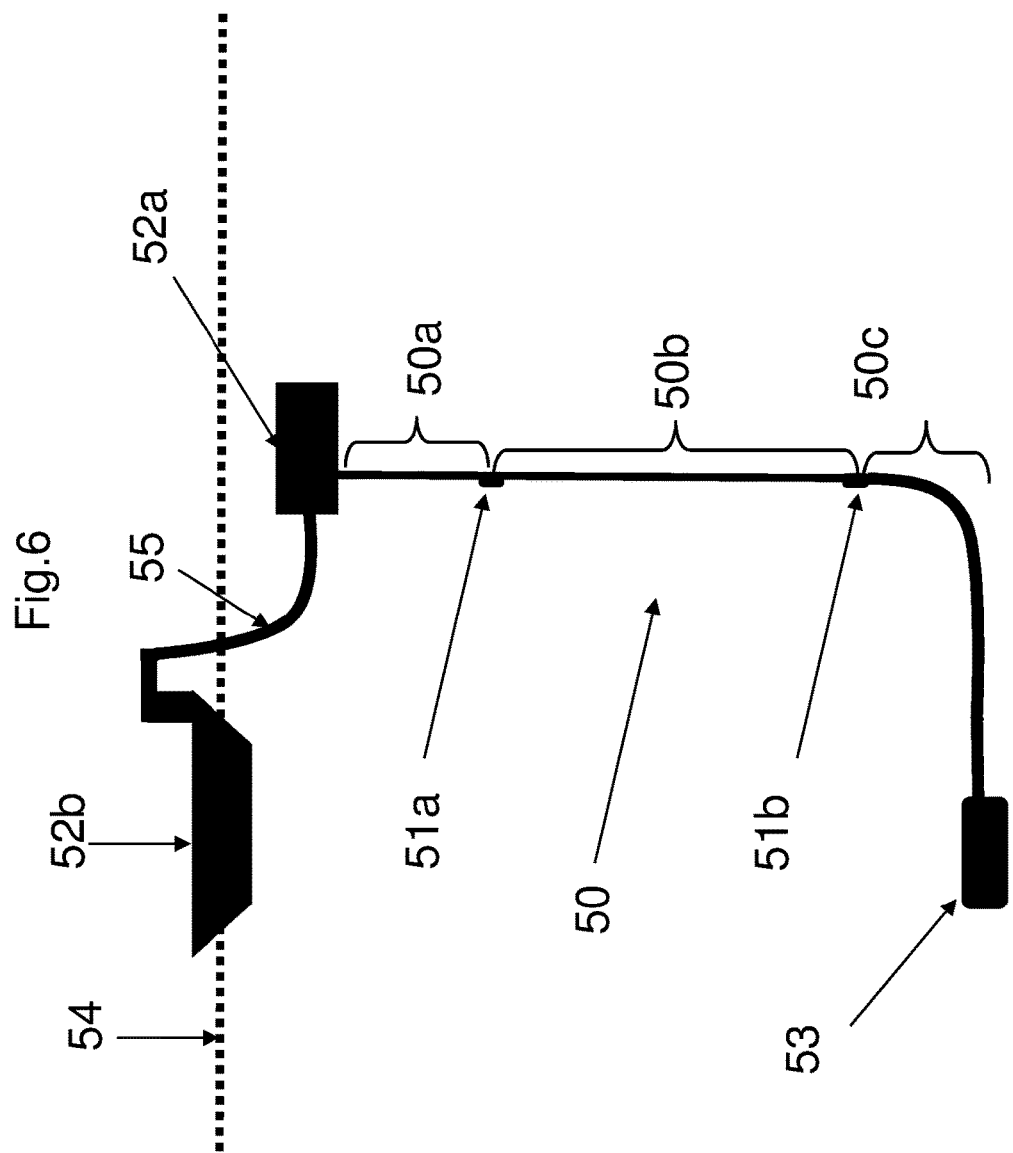

FLEXIBLE PIPE

TECHNICAL FIELD

The invention relates to a flexible pipe for onshore or offshore transportation of fluids like hydrocarbons, CO2, water and mixtures hereof, in particular suitable for offshore and subsea applications. The invention also relates to a method of producing such pipe.

BACKGROUND ART

Large quantities of flexible pipes are used within the oil industry, basically for offshore production, but frequently onshore as well. In particular for offshore production flexible pipes are in many cases the only solution. The connection between the fixed equipment placed on the seabed and the floating drilling or production units usually requires flexible pipes. There are basically two types of flexible pipes: "unbonded flexible pipe" as described in standard "Specification for Unbonded Flexible Pipe", ANSI/API 17J, Third edition, July 2008 and "Recommended Practice for Flexible Pipe", ANSI/API 17 B, fourth Edition, July 2008, and "bonded flexible pipe" as described in API 17K "Specification for Bonded Flexible Pipe" Mar. 1, 2002 and "Recommended Practice for Flexible Pipe", ANSI/API 17 B, fourth Edition.

The unbonded flexible pipe construction consists of separate unbonded polymeric and metallic layers, which allow relative movement between layers, in particular in the form of sliding between an armor layer and adjacent layers. The armor layers are usually mainly of elongate and helically wound elements where respective windings thereof can move relative to each other e.g. by sliding between adjacent windings.

In the bonded flexible pipes the steel reinforcement is integrated and bonded to a vulcanized elastomeric material such that the reinforcements become embedded into the polymer. Both constructions are spoolable; the bonded construction is generally used in short lengths up to 30-40 m, but it is normally available up to a few hundred meters in single pieces, which optionally can be assembled with intermediate couplings.

An unbonded flexible pipe usually comprises an inner liner, often also called an inner sealing sheath or an inner sheath, which is the innermost sealing sheath and which forms a barrier against the outflow of the fluid which is conveyed in the bore of the pipe, and one or more armoring layers. Often the pipe further comprises an outer protection layer which provides mechanical protection of the armor layers. The outer protection layer may be a sealing layer sealing against ingress of sea water. In certain unbonded flexible pipes one or more intermediate sealing layers are arranged between armor layers.

In general flexible pipes are expected to have a lifetime of 20 years in operation.

Examples of unbonded flexible pipes are e.g. disclosed in U.S. Pat. No. 6,978,806; U.S. Pat. No. 7,124,780; U.S. Pat. No. 6,769,454 and U.S. Pat. No. 6,363,974.

In practice the known unbonded pipe normally comprises at least two armoring layers located outside an innermost sealing sheath and optionally an armor structure located inside the innermost sealing sheath normally referred to as a carcass, where the armoring layers and optional carcass are not interfacially bonded to each other.

The term "sealing sheath" is herein used to designate a liquid impermeable layer, normally comprising or consisting of polymer. The term "inner sealing sheath" designates the innermost sealing sheath. The term "intermediate sealing sheath" means a sealing sheath which is not the inner sealing sheath and which comprises at least one additional layer on its outer side. The term "outer sealing sheath" means the outermost sealing sheath.

The armoring layers usually comprise or consist of one or more helically wound elongated armoring elements, where the individual armor layers and elements thereof are not bonded to each other directly or indirectly via other layers along the pipe. Thereby the pipe becomes bendable and sufficiently flexible to roll up for transportation.

A traditional prior art flexible unbonded pipe comprises from inside and outwards an optional carcass (sometimes also called an inner armor), an innermost sealing sheath, a pressure armor, a tensile armor and optionally an outer protection sheath for mechanical protection and/or for sealing against ingress of seawater in use. The pipe may comprise additional layers, such as anti-wear layers between armor layers, insulating layers, intermediate sealing layers and/or an anti-birdcage layer outside the outermost tensile layer to prevent the tensile armor layer from buckling.

The carcass has the purpose of protecting the innermost liner against compressive forces, either due to mechanical forces acting on the pipe or due to compressed fluids trying to squeeze the liner, and thereby preventing the pipe from collapsing e.g. when subjected to hydrostatic pressure. The carcass usually comprises helically wound and interlocked elongate armor elements. The innermost sealing sheath forms the innermost sealing sheath and defines the bore of the pipe.

The tensile armor is usually in the form of a plurality of tensile armor layers which are usually pair-wise cross wound (wound with opposite winding direction). The tensile armor layers are normally composed of elongate armor elements which are helically wound with a relative low winding angle relative to the axis of the pipe—e.g. about 55 degrees or very often less. The tensile armor has the purpose of providing the pipe with strength in its length direction and preventing undesired elongation of the pipe while still maintaining high flexibility.

The pressure armor is usually in the form of one or more layers composed of helically wound steel elements which are wound with a relatively high winding angle to the axis of the pipe. The pressure armor mainly has the purpose of protecting the pipe against internal pressure (from inside of the pipe and outwards) provided by the fluid transported in the pipe. Such pressure can be very high and often varies along the length of the pipe as well as over time. The pressure armor may to some degree also protect against external pressure (from outside of the pipe) in particular if the pipe has a liquid impermeable sheath on the outer side of the pressure armor.

Usually it is desired to interlock the windings of the armor elements of the pressure armor to avoid uncontrolled displacement of the windings along the length of the pipe and thereby control the maximal gaps between windings such as e.g. described in U.S. Pat. No. 5,813,439. Such undesired gaps between windings may result in lateral buckling and/or in damaging the innermost sealing sheath by entrapment in gaps of the windings. Lateral buckling may for example occur when the pipe is subjected to axial compression. This phenomenon is also called "reverse end cap effect" or "inverse bottom effect". The interlocked windings are formed to have a 'play' which means that adjacent windings can move towards or away from each other at a certain distance to each other. The range of movement between such adjacent interlocked windings of armor elements is called a play. By interlocking adjacent windings of pressure armor elements it is ensured that the distance between such windings is limited to a selected maximum while allowing flexibility of the pipe.

However, it is rather expensive to interlock the windings of the armor elements of the pressure armor and it requires expensive production equipment.

DISCLOSURE OF INVENTION

The object of the present invention is to provide a flexible pipe of the above type which is relatively simple and less costly to produce while simultaneously obtaining a flexible pipe of high strength and high flexibility and where the risk of damage of the innermost sealing sheath due to gaps in a surrounding reinforcement layer is low.

The invention also relates to a method of producing a flexible pipe of the above type which is relatively simple and less costly to produce while simultaneously obtaining a flexible pipe of high strength and high flexibility and where the risk of damage of the innermost sealing sheath due to gaps in a surrounding reinforcement layer is low.

This and other objects have been solved by the invention as defined in the claims and as described herein below.

It has been found that the invention and embodiments thereof have a number of additional advantages which will be clear to the skilled person from the following description.

The flexible pipe of the invention has a longitudinal axis which is the center of the bore of the pipe. The flexible pipe comprises a pressure resilient core pipe structure with an inner surface defining the bore of the pipe, and at least a pair of cross wound and non-bonded tensile armor layers surrounding the core pipe structure. The tensile armor layers may be as they usually are for unbonded flexible pipes e.g. as disclosed in the standard "Recommended Practice for Flexible Pipe", ANSI/API 17 B, fourth Edition, July 2008, and the standard "Specification for Unbonded Flexible Pipe", ANSI/API 17J, Third edition, July 2008. Examples of suitable tensile armor layers will be described further below.

The pressure resilient core pipe structure comprises an embedded pressure armor structure. The embedded pressure armor structure comprises a plurality of layers of helically wound continuous fibers, wound with a winding angle of about 60 degrees or more relative to the longitudinal axis of the pipe and embedded in a cured polymer matrix. Then the fibers are individually bonded to the cured polymer matrix.

Due to the construction of the flexible pipe of the invention it has been found that the flexible pipe can be used at surprisingly high pressure conditions, both with respect to pressure inside the bore and hydrostatic pressure outside the bore. It has been found that the fact that the continuous fibers are individually bonded to the cured polymer matrix and simultaneously provided in a plurality of layers of the pressure resilient core pipe structure provide the flexible pipe with a high hoop strength and a high flexibility compared with prior art bonded pipes and simultaneously the flexible pipe does not comprise an innermost sealing sheath which is in risk of being damaged due to gaps of a surrounding armor layer.

The flexible pipe is simultaneously relatively simple and economical feasible to produce. Due to the layered structure of the continuous fibers a very high fiber density of the layer or layers of the pressure resilient core pipe structure comprising the helically wound continuous fibers can be obtained while simultaneously ensuring that the continuous fibers are individually bonded to the cured polymer matrix.

Advantageously each layer of helically wound continuous fibers has a fiber density of at least about 40%.

The flexible pipe of the invention has been found to be very suitable for use as a riser. It has been found that the flexible pipe of the invention can be applied as a riser even at deep waters e.g. 2000 m or deeper. Ballast or other means may be applied to the lowermost part of the riser if its weight in itself is too low, alternatively additional metal armors may be embedded into the pressure resilient core pipe structure exclusively in the lower part of the riser.

The flexible pipe may be provided with a carcass. However, it has been found that in most situations the flexible pipe does not need to have such carcass since the pressure resilient core pipe structure provides a sufficient strength against collapse even without a carcass. Also it is advantageous that the flexible pipe is free of any carcass and has an essentially smooth inner side surrounding the bore, thereby reducing any risk of formation of undesired vibrations. Such undesired vibrations are usually referred to as 'singing risers' or 'vortex' and may result in undesired damage of the pipe.

The phrase "layer of helically wound continuous fibers" when embedded includes a thickness layer of the cured polymer matrix into which the continuous fibers are embedded, wherein the thickness layer is determined as the layer sufficient to contain the layer of helically wound continuous fibers.

The term "in radial direction" means a direction from the axis of the pipe and radially outwards.

The term "axial distance" is used herein to mean the perpendicular distance to the axis of the pipe when the pipe is substantially straight.

The terms "inside" and "outside" a layer of the pipe is used to designate the relative distance to the axis of the pipe, such that "inside a layer" means the area encircled by the layer i.e. with a shorter axial distance than the layer, and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The term "essentially smooth" means herein substantially free of cavities and protrusions which are visible by the average eye.

The term "substantially" should herein be taken to mean that ordinary product variances and tolerances are comprised.

The term "cross-wound layers" means that the layers comprise wound elongate elements that are wound in opposite direction relatively to the longitudinal axis of the pipe where the angle to the longitudinal axis can be equal or different from each other.

The term "continuous fiber" means any fiber that has a significant length and is generally continuous in a length section of at least about 10 m, preferably at least about 100 m, more preferably at least about 1000 m. The continuous fiber may be provided by interconnecting sections of shorter continuous fibers e.g. by knotting the shorter continuous fibers in an end-by-end configuration to preferably obtain continuous fibers extending in the whole length of the flexible pipe.

The term "axial distance" is used herein to mean the perpendicular distance to the axis of the pipe when the pipe is substantially straight.

The term "unbonded layers" means in this text that the unbonded layers are not interfacially bonded.

The term "bonded layers" means in this text that the bonded layers are interfacially bonded in their entire interface to each other.

The term 'riser' is herein used to designate a transportation line with a generally vertical orientation e.g. a pipe riser for transportation of fluid or a cable riser for transportation of electricity, signals and similar. An umbilical is usually a riser of the cable comprising several elements i.e. of cable type riser and/or pipe type riser.

The term 'uppermost' and 'lowermost' when used in connection with a riser should be interpreted to mean in relation to the distance along the riser determined from the seabed i.e. 'uppermost' means with the longest distance along the riser to the seabed and 'lowermost' means with the shortest distance along the riser to the seabed.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term 'seabed' is generally used to denote the subsea floor.

The term "water line" means the water line at still water. Unless specifically mentioned all distances and determinations in relating to the water line are made at still water at average water level.

In the following description the term "elongate armor element" when used in singular should be interpreted to also include the plural meaning of the term unless it is specifically stated that it means a single elongate armor element.

A term when used in singular should be interpreted to also include the plural meaning of the term unless it is specifically stated that the term should have only the singular meaning Advantageously each of the layers of helically wound continuous fibers comprise a plurality of fibers, each continuous fiber wound adjacent to neighboring continuous fibers, preferably adjacent continuous fibers are touching or have a distance to each other of up to about 2 mm, such as up to about 1 mm.

In an embodiment adjacent continuous fibers have a distance up to about the average thickness of the continuous fibers of the layer.

Generally it is desired that the continuous fibers of a layer are wound to form a layer of side-by-side arranged continuous fibers. Thereby a very high fiber density of the embedded layer of helically wound continuous fibers can be obtained. In the production the continuous fibers may advantageously be wound from a plurality of bobbins each comprising a continuous fiber or a number of continuous fibers.

In an embodiment each of the layers of helically wound continuous fibers have a fiber density of at least about 50%, preferably at least about 60%, such as at least about 70%, such as at least about 75%.

The fiber density is determined in vol. %/vol. %. The fiber density may e.g. be determined by visual determination in a cross sectional cut through the pressure resilient core pipe structure perpendicular to the longitudinally axis.

The continuous fibers may be identical or different. Generally it is desired that the continuous fibers of a layer of helically wound continuous fibers are substantially equal in thickness and preferably the continuous fibers of a layer of helically wound continuous fibers are substantially identical i.e. they are also of same material.

In an embodiment each of the layers of helically wound continuous fibers comprise a plurality of substantially identical fibers. Thereby a good balanced flexible pipe with optimal strength can be obtained.

The individual layer of helically wound continuous fibers can be embedded in the same or in distinguished layers of cured polymer matrix. To obtain a high flexibility it is generally desired that the layers of helically wound continuous fibers are applied relatively close to each other e.g. one above the other.

In an embodiment at least two of the plurality of layers of helically wound continuous fibers are embedded in a common layer of cured polymer matrix. The common layer of cured polymer matrix preferably comprises all of the plurality of layers of helically wound continuous fibers. Since each step of applying the polymer for a cured polymer matrix may add to production cost, it is an advantage to reduce the number of such steps.

In an embodiment at least two of the plurality of layers of helically wound continuous fibers are embedded in distinct layers of cured polymer matrix. By applying distinct layers of cured polymer matrix's, each with at least one layer of helically wound continuous fibers, an increased hoop strength may be obtained but it may result in slightly less flexibility. However, for certain applications this combination of properties is desired.

As mentioned above the layer thickness of a layer of helically wound continuous fibers includes the layer which accurately contains the continuous fibers of the layer. This means that in a layer where the continuous fibers are slightly offset in axial direction of the pipe, the layer thickness of this layer of helically wound continuous fibers may increase the thickness of the continuous fibers.

Generally it is desired that each of the layers of helically wound continuous fibers have a layer thickness corresponding to 2 times the average thickness of the continuous fibers or less.

For ensuring a very high fiber density of a layer of helically wound continuous fibers it is desired that the layer thickness is less than 2 times the average thickness of the continuous fibers.

Advantageously each of the layers of helically wound continuous fibers have a layer thickness corresponding to the maximal thickness of the continuous fibers, and preferably the thickness of the continuous fibers of the respective layer are advantageously equal.

In an embodiment the continuous fibers in each respective layer of helically wound continuous fibers have equal thickness, preferably the continuous fibers in each respective layer of helically wound continuous fibers are substantially identical.

The flexible pipe may in principle have as many layers of helically wound continuous fibers as desired. To ensure a good flexibility it is generally desired that the number of layers of helically wound continuous fibers is up to 50 layers, such as from about 4 to about 30 layers, such as from about 12 to about 24 layers of helically wound continuous fibers. Advantageously the number of layers of helically wound continuous fibers is an even number, where some of them are wound in a first direction and the rest are wound in the opposite direction i.e. they are cross wound.

To ensure a good torsional balance it is desired that about half of the plurality of layers of helically wound continuous fibers are helically wound in a first direction and the remaining of the layers of helically wound continuous fibers are helically wound in the opposite direction of the first direction.

To obtain high strength and high flexibility simultaneously with an increased durability it is desired that at least a number of the plurality of layers of helically wound continuous fibers are helically wound one above the other, preferably such that the continuous fibers of one layer of helically wound continuous fibers are in contact with continuous fibers of helically wound continuous fibers of a radially inside and/or a radially outside layer of helically wound continuous fibers. Thereby the contacting layers of continuous fibers cooperate to increase strength while the load may be evenly distributed among the layers thereby increasing durability of the pipe. Simultaneously the flexibility may be maintained at a very high level even where the number of layer of helically wound continuous fibers are relatively high.

In an embodiment the plurality of layers of helically wound continuous fibers are arranged in one or more stacks of contacting layers, preferably the plurality of layers of helically wound continuous fibers are arranged in up to four stacks of contacting layers. "Contacting stacks" should be taking to mean that the continuous fibers of respective layers are in physical contact.

The continuous fibers are as mentioned very long fibers. Such fibers are often referred to as endless fibers even though they are not endless but preferably function as such in their applications.

Advantageously at least 50%, such as at least 90% of the continuous fibers have lengths of at least about 100 m, preferably at least about 500 m.

In an embodiment the continuous fibers are spun from cut fibers.

The term "cut fibers" means herein fibers of non-continuous length, e.g. in the form of chopped fibers or melt blown fibers. The cut fibers are usually relatively short fibers e.g. less than about 5 cm, such as from about 1 mm to about 3 cm in length. The cut fibers may have equal or different lengths.

Preferably the continuous fibers are or comprise filaments. In an embodiment a major part, such as all of the continuous fibers are filaments.

Filaments are continuously single fiber (also called monofilament).

In an embodiment the continuous fibers are yarns.

The term "yarn" is used to designate a twisted bundle of filaments and/or cut fibers. Yarn includes threads and ropes. The yarn may be a primary yarn made directly from filaments and/or cut fibers or a secondary yarn made from primary yarns and/or cords. Secondary yarns are also referred to as cords.

In an embodiment the continuous fibers comprises yarns, preferably yarns comprising filaments, the yarns are preferably primary yarns.

Preferably the continuous fibers are yarns of filaments.

In an embodiment the continuous fibers comprise braided filaments.

In an embodiment the continuous fibers are braided filaments.

The thickness of a continuous fiber is determined as the average diameter of the fiber. The terms diameter and thickness when relating to fibers are used interchangeably.

The diameter or thickness of the continuous fibers is advantageously at least about 5 $\mu$m and up to about 2 mm. The individual filaments usually have a thickness of 25 $\mu$m or less.

In an embodiment the continuous fibers are yarns of filaments where the fibers have a thickness of from about 0.1 to about 1 mm.

Any kind of continuous fibers with a suitable strength can in principle be used.

In an embodiment the continuous fibers comprise carbon fibers, glass fibers, basalt fibers, polymer fibers and combinations thereof. Preferred fibers include in particular glass fibers and basalt or combinations of glass fibers and basalt.

In an embodiment the polymer fibers are selected from thermoset polymer fibers, such as epoxy fibers, polyester fibers, vinylester fibers, polyurethane fibers, phenolic fibers and thermoplastic polymer fibers, such as aramide fibers, polypropylene fibers, polyethylene fibers, polycarbonate fibers, thermoplastic polyester fibers and mixtures thereof, preferably the thermoplastic polymer fiber(s) preferably has/have a melting temperature of at least about 150° C., such of at least about 200° C.

To ensure a good bonding between the individual continuous fibers and the cured polymer matrix the continuous fibers of the embedded pressure armor structure are advantageously impregnated (pre-impregnated) with a polymer which is equal to or different from the cured polymer matrix in which the elongate armor elements are embedded. Where the impregnating polymer and the polymer of the cured polymer matrix identical, it may be different to visually observe a pre-impregnation of the continuous fibers, however, usually the bonding strength will be stronger where the continuous fibers have been pre-impregnated.

Where the impregnation of the continuous fibers is performed using an impregnating polymer that differs from the polymer of the cured polymer matrix, the impregnating polymer and the polymer of the cured polymer matrix are advantageously selected such that a strong bonding can be ensured.

In an embodiment the impregnating polymer forms a bonding between the individual continuous fibers and the cured polymer matrix.

Advantageously the fibers are impregnated (i.e. the continuous fibers have been pre-impregnated with curable resin prior to application and curing) with resin which has been cured, such as an epoxy resin.

The continuous fibers may in principle be helically wound with a winding direction having any angle of at least about 60 degrees relative to the longitudinal axis of the pipe.

In an embodiment the continuous fibers are helically wound with a winding angle of at least about 70 degrees, such as at least about 80 degrees relative to the longitudinal axis of the pipe.

Advantageously about half of the layers of helically wound continuous fibers are wound in a first direction with a first winding angle and the remaining layers of helically wound continuous fibers are wound in a second direction opposite to the first direction and with a second winding angle which may be up to about +−20 degrees different from the first winding angle.

In an embodiment about half of the layers of helically wound continuous fibers are wound in a first direction with a first winding angle and the remaining layers of helically wound continuous fibers are wound in a second direction opposite to the first direction and with a second winding angle, which second winding angle is substantially equal to the first winding angle.

In an embodiment pair wise layers of helically wound continuous fibers are wound in opposite direction with substantially equal winding angles.

In an embodiment a plurality of pair wise layers of helically wound continuous fibers are wound in opposite direction with substantially equal winding angles, wherein the plurality of pair wise layers are wound with different angles.

In an embodiment the pressure resilient core pipe structure has an outer surface and a thickness between the inner surface and the outer surface determined in radial direction, the thickness of the pressure resilient core pipe structure being preferably at least about 0.2 cm, preferably from about 0.4 cm to about 5 cm.

The plurality of layers of helically wound continuous fibers of the pressure resilient core pipe structure is advantageously concentrated in at least one thickness region of the pressure resilient core pipe structure in order to ensure high strength while maintaining high flexibility. Preferably the elongate armor elements are concentrated in a thickness region of the pressure resilient core pipe structure at a distance from the inner surface of the pressure resilient core pipe structure.

Advantageously the pressure resilient core pipe structure is a layered structure comprising an inner polymer layer and at least one outer layer surrounding the inner polymer layer. In this embodiment the inner polymer layer advantageously corresponds to an innermost sealing sheath of an unbonded flexible pipe. Preferably the continuous fibers are concentrated in at least one of the at least one outer layer of the pressure resilient core pipe structure, i.e. at least one outer layer of the pressure resilient core pipe structure is provided by the embedded pressure armor structure.

Advantageously the inner polymer layer is substantially free of the continuous fibers.

The inner polymer layer is preferably of a substantially homogeneous polymer, preferably selected among polyolefins, cross-linked or not, for example polyethylene (PE) or polypropylene (PP); polyamides, for example polyamide 11 (PA-11) or polyamide 12 (PA-12); fluorinated polymers, for example polyvinylidene fluoride (PVDF); polysulfides, for example polyphenylene sulfide (PPS); polyurethanes (PU); polyesters; polyacetals; polyethers, for example polyethersulfone (PES), polyetheretherketone (PEEK) and rubbers such as butyl rubber, most preferred the inner polymer layer is of PA-12, high density PE (HDPE), cross-linked polyethylene (XLPE), PVDF or combinations thereof.

In an embodiment the inner polymer layer is the innermost layer of the pressure resilient core pipe structure.

In order to protect against migrating aggressive gasses from hydrocarbons transported in the flexible pipe the pressure resilient core pipe structure comprises in an embodiment an innermost film layer on the inner side of the inner polymer layer, the innermost film layer is preferably a metal layer.

The innermost film layer may advantageously be applied and bonded to the inner polymer layer as described in WO06097112A2.

The film layer may in principle be a film of any type of material which, preferably in the desired thickness e.g. less than 2 mm or even less than 1 mm, is flexible.

Useful film layers include materials of the group consisting of polymer, metal, metal containing compositions and combinations thereof.

In an embodiment, the film layer is made from metal e.g. in the form of a metal film such as a film comprising or consisting of aluminum, stainless steel and/or duplex.

Desired thickness of the film layer is therefore in general less than 4 mm. The film layer may thus e.g. have a thickness of about 25 µm or more, such as about 100 µm or more, such as about 500 µm or more, such as about 1 mm or less.

In an embodiment, the film is in the form of a tape wound onto the pipe, where the term "tape" includes thin films of 1 mm or less and with a width of up to 10 cm.

In one embodiment, the film layer provides a fluid permeation barrier against one or more and preferably all of the fluids methane, hydrogen sulphides, carbon dioxides and water, which is higher, such as least 50% higher, such as least 100% higher, such as least 500% higher, such as least 1000% higher, than the fluid permeation barrier provided by the inner polymer layer determined at 50° C. and a pressure difference of 50 bar.

In an embodiment at least one outer layer of the pressure resilient core is an intermediate layer in form of an intermediate film layer, the intermediate film layer is preferably a metal layer.

The intermediate film layer may advantageously be applied and bonded onto the inner polymer layer as described in WO06097112A2.

The intermediate film layer is advantageously arranged directly outside and interfacially bonded to the inner polymer layer. In an embodiment an additional polymer layer free of elongate armor elements is arranged directly outside and interfacially bonded to the intermediate film layer.

In an embodiment an outer layer comprises the cured polymer matrix comprising at least a part of the layers of helically wound continuous fibers arranged outside the intermediate film layer. Preferably the cured polymer matrix is arranged directly outside the intermediate film layer and interfacially bonded thereto.

In an embodiment an outer layer comprising the cured polymer matrix comprises at least a part of the layers of helically wound continuous fibers, and preferably the outer layer comprising the cured polymer matrix comprises all of said layer of helically wound continuous fibers.

In an embodiment the outer layer comprising the cured polymer matrix is interfacially bonded to an underlying layer, such as the intermediate film layer, optionally via a bonding layer preferably comprising maleic anhydride.

The bonding layer is usually applied in a relatively thin layer, such as about 0.5 mm or less. Advantageously the bonds provided by the bonding layer are covalent bonds.

In an embodiment the outer layer comprising the cured polymer matrix is an outermost layer of the pressure resilient core pipe structure. Thereby the flexible pipe can be provided with a wall thickness which is as small as possible, which facilitates both a low weight and a high flexibility.

In an embodiment the pressure resilient core pipe structure comprises an outermost polymer layer free of the layers of helically wound continuous fibers arranged, the outermost polymer layer is preferably of a substantially homogeneous polymer, preferably selected among polyolefins, cross-linked or not, for example polyethylene (PE) or polypropylene (PP); polyamides, for example polyamide 11 (PA-11) or polyamide 12 (PA-12); fluorinated polymers, for example polyvinylidene fluoride (PVDF); polysulfides, for example polyphenylene sulfide (PPS); polyurethanes (PU); polyesters; polyacetals; polyethers, for example polyethersulfone (PES), polyetheretherketone (PEEK) and rubbers such as butyl rubber, most preferred the inner polymer layer is of PA-12, high density PE (HDPE), cross-linked polyethylene (XLPE), PVDF or combinations thereof.

The cured polymer matrix may be of any suitable material which preferably has a high chemical and thermal resistance.

In an embodiment the flexible pipe comprises an antifriction layer wound around the pressure resilient core pipe structure between the resilient core pipe structure and the pair of cross wound and non-bonded tensile armor layers, and preferably the anti-friction layer is in direct contact with, but non-bonded to the pressure resilient core pipe structure. The anti-friction layer may serve to improve the flexibility of the pipe, i.e. allow a smoother movement between the adjacent layers In an embodiment the pressure resilient core pipe structure comprises an outermost polymer layer in form of an anti-friction layer, such as a wound anti-friction layer, and preferably the anti-friction layer of the pressure resilient core pipe structure is directly below the pair of cross wound and non-bonded tensile armor layers.

A wound anti-friction layer is easy to apply during the production of the flexible pipe and in an embodiment the anti-friction layer is of a wound material, preferably wound edge-to-edge or with an edge-to-edge overlap of up to 50%, such as from about edge-to-edge to an overlap of about 30%. Winding the anti-friction layer with an overlap may facilitate the production of a pipe with an anti-friction layer, and also ensure an anti-friction layer with good properties.

In an embodiment the anti-friction layer is made from a tape having a thickness of up to about 3 mm, such as from about 0.1 to about 2 mm, such as from about 0.5 to about 1.5 mm. Such a tape is easy to handle in the production and the tape will not add much extra weight to the produced pipe.

In an embodiment the anti-friction layer is made from or comprises a polymer tape, preferably selected from a fluoride containing polymer. Fluoride containing polymers made provide very smooth surfaces with very low friction.

The anti-friction layer may also comprise fibers and in an embodiment the anti-friction layer is made from a fibrous tape, preferably comprising a woven or braided fibrous material optionally impregnated with a polymer, such as a resin, preferably a cured resin, such as a cured thermosetting resin, preferably selected from epoxy resins, vinylepoxyester resins polyester resins, polyimide resins, bis-maleimide resins, cyanate ester resins, vinyl resins, benzoxazine resins, benzocyclobutene resins, polyolefins or mixtures comprising at least one of the foregoing thermosetting resins.

An anti-friction layer comprising fibers is durable and possess in improved strength.

In an embodiment the cured polymer matrix comprising the embedded elongate armor elements comprises a cured thermosetting resin, preferably selected from epoxy resins, vinylepoxyester resins polyester resins, polyimide resins, bis-maleimide resins, cyanate ester resins, vinyl resins, benzoxazine resins, benzocyclobutene resins, polyolefins or mixtures comprising at least one of the foregoing thermosetting resins.

In an embodiment the cured polymer matrix comprises cross-linked polyolefins, such as cross-linked polyethylene.

In an embodiment the cured polymer matrix comprises a cured elastomer.

In an embodiment the cured polymer matrix comprises cured epoxy resin.

Where the flexible pipe is adapted for transportation of hydrocarbons with a high acid concentration of e.g. H2S or C02 it may be advantageous to incorporate one or more acidic neutralizing chemically active compounds into the pressure resilient core pipe structure, in particular where the flexible pipe comprises a metal containing tensile armor layer. In an embodiment the pressure resilient core pipe structure comprises at least one acidic neutralizing chemically active compound, preferably in the form of a chemically active compound which can neutralize at least one of CO2 and H2S, preferably the chemically active compound is selected from ZnO, PbO, CuO, CdO, NiO, SnO2 and MoO3, and combinations thereof.

The chemically active compound can for example be as described in US2011120583A.

Advantageously the chemically active compound is incorporated into the polymer matrix of the pressure resilient core pipe structure.

In an embodiment the chemically active compound is incorporated into the inner polymer layer of the pressure resilient core pipe structure.

In an embodiment the pressure resilient core pipe structure comprises at least one cationic clay silicate incorporated in order to increase barrier properties against aggressive gasses. The cationic clay silicate may for example be kaolinite; smectite; Illite; chlorite; and/or synthetic cationic clays.

The cationic clay silicate may e.g. be as described in US2010062202.

Advantageously the cationic clay silicate is incorporated into the polymer matrix of the pressure resilient core pipe structure.

In an embodiment the cationic clay silicate is incorporated into the inner polymer layer of the pressure resilient core pipe structure.

The pair of cross wound and non-bonded tensile armor layers are advantageously wound with a winding angle of about 55 degrees or less, such as with a winding angle of from about 30 degrees to about 45 degrees relative to the longitudinally axis of the pipe.

Preferably the plurality of armor layers surrounding the core pipe structure are not bonded to each other or to the bonded pressure armor layer. The plurality of armor layers surrounding the core pipe are preferably an even number e.g. 2, 4, 6 or 8.

Generally it is desired that each of the pluralities of armor layers surrounding the core pipe structure comprise a plurality of helically wound elongate armor elements, which elongate armor elements are not bonded to each other.

In an embodiment at least one of the pluralities of armor layers surrounding the core pipe structure comprises a plurality of elongate armor elements made from metal, e.g. in the form of metal wires. The metal wires may e.g. be as generally known from the art of unbonded flexible pipe e.g. as described in the standard "Recommended Practice for Flexible Pipe", ANSI/API 17 B, fourth Edition, July 2008, and the standard "Specification for Unbonded Flexible Pipe", ANSI/API 17J, Third edition, July 2008.

In an embodiment at least one of the pluralities of armor layers surrounding the core pipe structure comprises a plurality of elongate armor elements made from fiber reinforced polymer. Examples of suitable elongate armor elements made from fiber reinforced polymer are described in U.S. Pat. No. 6,165,586 or WO 01/51839.

In an embodiment the flexible pipe comprises one or more thermal insulation layers embedded into the pressure resilient core pipe structure.

The flexible pipe may comprise other unbonded layers surrounding the pressure resilient core pipe structure such as the type of layers usually known from the art of unbonded pipes.

In an embodiment the flexible pipe comprises one or more thermal insulation layers which may be wound or extruded layers.

In an embodiment the flexible pipe comprises a holding layer outside the outermost of the tensile armor layers, the holding layer is advantageously in the form of a wound layer comprising one or more helically wound strips wound with a winding angle of about 60 degrees or more preferably of about 75 degrees or more.

In an embodiment the flexible pipe comprises an outermost protection sheath. The outermost protection sheath may be liquid permeable or it may be a sealing layer.

In an embodiment the flexible pipe may comprise one or more optical fibers for a monitoring arrangement. The one or more optical fibers may be incorporated in any desired layer of the flexible pipe.

The invention also concerns a method of producing a flexible pipe as described above.

The method comprises providing a pressure resilient core pipe structure with an inner surface defining a bore and a longitudinal axis of the pipe, and winding at least a pair of cross wound and non-bonded tensile armor layers to surround the core pipe structure.

The production of the pressure resilient core pipe structure comprises providing at least one layer of a curable polymer matrix and winding a plurality of layers of continuous fibers with a winding angle of about 60 degrees or more relative to the longitudinal axis of the pipe. The plurality of layers of continuous fibers are wound onto the layer of curable polymer matrix such that the individually continuous fibers are embedded in the curable polymer matrix. After the winding the method comprises curing the curable polymer matrix.

In an embodiment where the curable polymer matrix has a relatively low viscosity, the curable polymer matrix material may be applied in several layers simultaneously or in consecutive steps of application of the plurality of layers of continuous fibers. If desired, intermediate partly curing steps may be performed.

To ensure a stability of the curable polymer matrix during the winding of the continuous fibers the curable polymer matrix may—depending of the viscosity of the material used—optionally be partly cured prior to winding of the continuous fibers.

The method is adjusted in dependence on the structure of the flexible pipe to be produced.

In an embodiment the method comprises winding each of the layers of continuous fibers from a plurality of continuous fibers, such that each continuous fiber is wound adjacent to neighboring continuous fibers. Advantageously adjacent continuous fibers are arranged to touch or have a distance to each other of up to about 2 mm, such as up to about 1 mm.

In an embodiment the method comprises winding a plurality of layers of continuous fibers to be embedded in a common layer of curable polymer matrix.

In an embodiment the method comprises providing two or more layers of curable polymer matrix.

In an embodiment the method comprises winding the plurality of layers of continuous fibers one above the other, preferably such that the continuous fibers of one layer of helically wound continuous fibers are in contact with continuous fibers of helically wound continuous fibers of a radial inside and/or a radial outside layer of helically wound continuous fibers.

In an embodiment the method comprises winding the plurality of layers of continuous fibers to be embedded in the curable polymer matrix to ensure that each of the layers of helically wound continuous fibers have a fiber density of at least about 40%, preferably at least about 50%, such as at least about 60%, such as at least about 70%, such as at least about 75%.

In an embodiment the method comprises impregnating (also referred to as "pre-impregnating") the continuous fibers with a curable resin prior to winding, preferably the resin differs from the curable polymer matrix into which the wound continuous fibers are embedded. The pre-impregnating may advantageously be as described above.

In an embodiment the method comprises extruding an inner polymer layer wherein the at least one layer of a curable polymer matrix is provided outside the inner polymer layer. The inner polymer layer is preferably the innermost layer of the pressure resilient core pipe structure or the pressure resilient core pipe structure comprises an innermost layer in the form of an innermost film layer.

In an embodiment the inner polymer layer is of a substantially homogeneous polymer, as described above.

In an embodiment the method comprises applying an intermediate layer in the form of an intermediate film layer between the inner polymer layer and the curable polymer layer, the intermediate film layer is preferably a metal layer.

In an embodiment the method comprises applying a layer of bonding material prior to applying the curable polymer layer for increasing interfacial bonding between the cured polymer layer and an underlying layer, the bonding layer preferably comprising maleic anhydride.

In an embodiment the curable polymer matrix comprises a thermosetting resin precursor for a thermoset polymer, preferably selected from epoxy resins, vinyl-epoxy-ester resins, polyester resins, polyimide resins, bis-maleimide resins, cyanate ester resins, vinyl resins, benzoxazine resins, benzocyclobutene resins, or mixtures comprising at least one of the thermosetting resin precursors, the moldable, curable impregnation substance preferably additionally comprises a hardener for the thermosetting resin precursor(s).

In an embodiment the curable polymer matrix comprises a thermoplastic polymer, the thermoplastic polymer preferable being cross-linkable, e.g. by peroxide, electromagnetic radiation, hydrolyse and optionally grafted silane and combinations thereof.

In an embodiment the curable polymer matrix comprises a curing agent, the curing agent for example being selected from sulphur, phenolic curing agents, aliphatic hardeners, amine and polyamine curing agents, peroxides at least, silanes and mixtures comprising at least one of the foregoing.

The curable polymer matrix advantageously comprises up to about 30% by weight of additives, such as fillers and extenders, such as up to about 25%, by weight of additives, such as up to about 20%, by weight of additives such as up to about 15%, by weight of additives such as up to about 10%, by weight of additives.

In a further aspect the invention also relates to a hybrid riser pipe for transporting fluid between an upper facility and a subsea facility. The riser has a center axis and a length along the center axis and comprises at least one unbonded flexible metal armored riser section and a composite pipe section.

The composite pipe section is preferably a flexible pipe as described above.

Thus the hybrid riser is a riser, which comprises a least two different types of risers, namely a composite pipe section and flexible metal armored riser section. The hybrid riser utilizes the advantages of both types of riser, i.e. the composite pipe which may be produced at low cost, but having good strength, and the metal armored riser which may resist high pressure.

In an embodiment the riser pipe comprises two unbonded flexible metal armored riser sections, in which one of the unbonded flexible metal armored riser sections is connected to a first end of the composite pipe section and the other one of the unbonded flexible metal armored riser sections is connected to a second end of the composite pipe section.

Preferably the composite pipe section is longer than each of the unbonded flexible metal armored riser sections. In an embodiment the composite pipe section has a length of at least about 100 m, such as at least about 500 m, such as at least about 1000 m, and each of the unbonded flexible metal armored riser sections has a length of up to about 50% of the length of the composite pipe section, such as of about 25%, such as of about 10% of the length of the composite pipe section. In this embodiment the composite pipe section, which may be produced at lower cost, constitutes at least about the half length of the hybrid riser pipe.

In an embodiment of the hybrid riser pipe the unbonded flexible metal armored riser section(s) comprises at least two cross-wound tensile armor layers each comprising a plurality of helically wound elongate metal armor elements wound with a winding angle of about 60 degree or less relative to the center axis. Preferably the unbonded flexible metal armored riser section comprises a liquid impervious inner sealing sheath defining a bore and sealing against outflow from the bore and a liquid impervious outer sealing sheath sealing against ingress of water and optionally one or more intermediate liquid impervious sheath(s), where the liquid impervious sheaths form at least one annulus, at least one of the cross-wound tensile armor layers being arranged in the annulus.

All features of the inventions including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which:

FIG. 5 is a schematic top view of a layer of helically wound continuous fibers of an embodiment of a flexible pipe of the invention under production.

FIG. 6 is a schematic depiction of a hybrid riser according to the invention.

Figure 1:
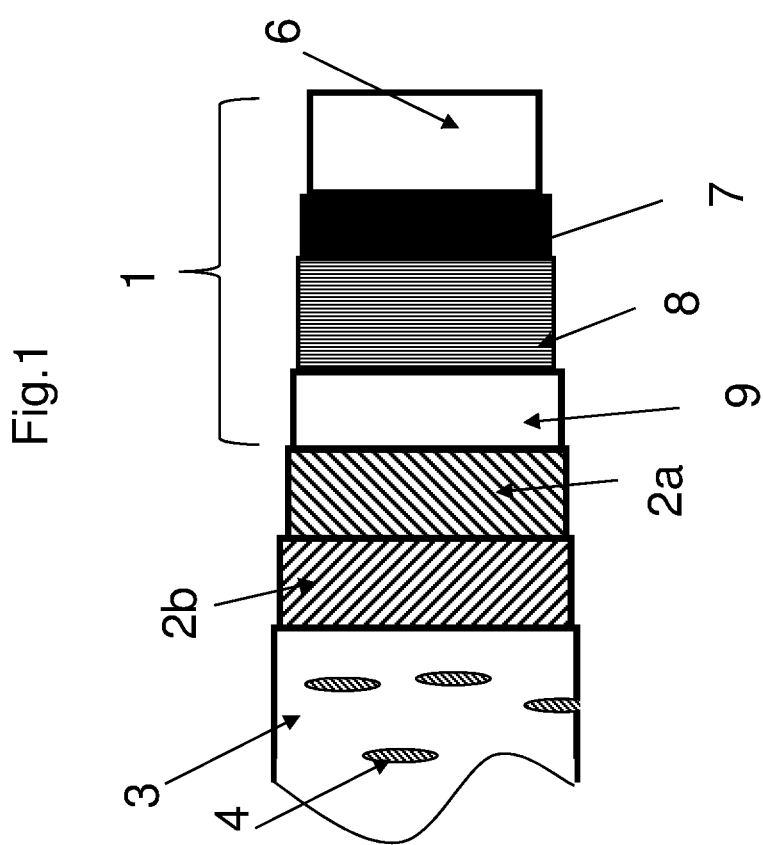
FIG. 1 is a schematic side view of a first embodiment of a flexible pipe of the invention.

The flexible pipe shown in FIG. 1 comprises a pressure resilient core pipe structure 1 and a pair of cross wound and non-bonded tensile armor layers 2a, 2b surrounding the core pipe structure 1. The pressure resilient core pipe structure comprises an embedded pressure armor structure 8 which comprises a plurality of layers of helically wound continuous fibers embedded in a cured polymer matrix. The helically wound continuous fibers are wound with a winding angle of about 60 degrees or more relative to the longitudinal axis of the pipe. The continuous fibers are individually bonded to the cured polymer matrix. The plurality of layers of helically wound continuous fibers embedded in a cured polymer matrix is wound as described above. The pressure resilient core pipe structure further comprises an inner polymer layer 6 providing an essentially smooth inner surface of the flexible pipe. An intermediate film layer 7 e.g. in the form of a wound metal layer e.g. with a thickness of 10 µm to 0.5 mm is applied between the inner polymer layer 6 and the embedded pressure armor structure 8. Outside the embedded pressure armor structure 8 the pressure resilient core pipe structure 1 comprises an outer polymer layer 9 free of the continuous fibers. The inner polymer layer, the intermediate film layer 7, the embedded pressure armor structure 8 and the outer polymer layer 9 form a bonded structure.

Between the pressure resilient core pipe structure 1 and the inner most tensile armor layer 2a, the flexible pipe preferably comprises a not shown anti-friction layer (also referred to as an anti-wear layer). Such layers are well known from the art of unbonded flexible pipes. Also between the pair of cross wound and non-bonded tensile armor layers 2a, 2b an anti-friction layer may advantageously be. Such an anti-friction layer is advantageously in the form of wound strips of a material with low friction such a textile impregnated with a cured resin or a modified PTFE material e.g. PPVE modified PTFE material.

Outside the pair of cross wound and non-bonded tensile armor layers 2a, 2b the flexible pipe comprises an outer protective sheath 3 with a plurality of orifices 4 for allowing water to come into contact with the pair of cross wound and non-bonded tensile armor layers 2a, 2b. The pair of cross wound and non-bonded tensile armor layers 2a, 2b is in this embodiment advantageously of composite material as described above.

Figure 2:
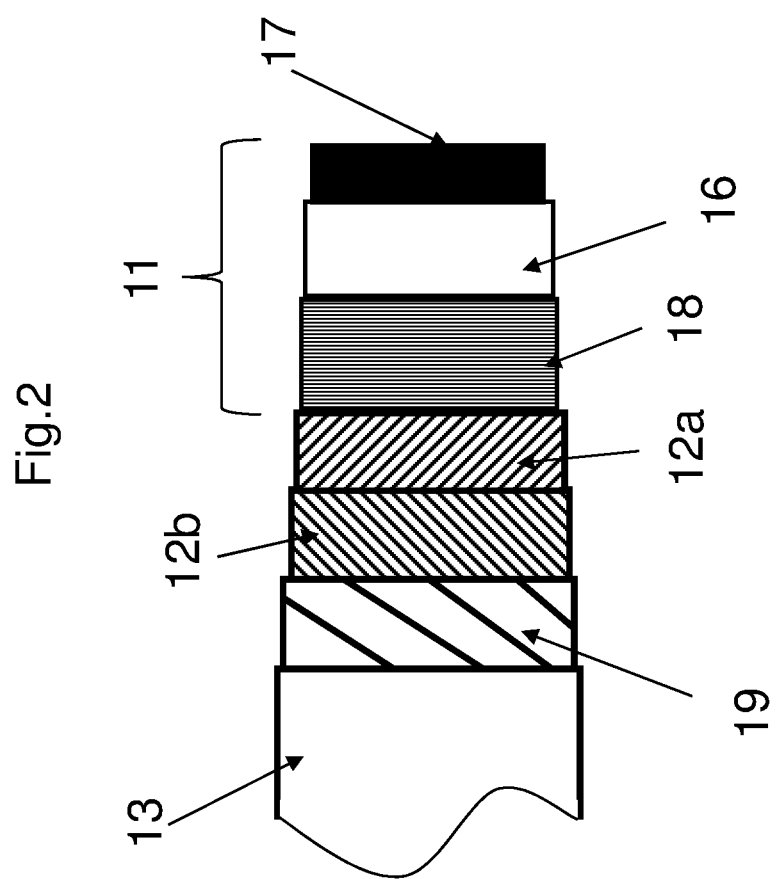
FIG. 2 is a schematic side view of a second embodiment of a flexible pipe of the invention.

The flexible pipe shown in FIG. 2 comprises a pressure resilient core pipe structure 11 and a pair of cross wound and non-bonded tensile armor layers 12a, 12b surrounding the core pipe structure 11. The pressure resilient core pipe structure 11 comprises an embedded pressure armor structure 18 which comprises a plurality of layers of helically wound continuous fibers embedded in a cured polymer matrix. The helically wound continuous fibers are wound with a winding angle of about 60 degrees or more relative to the longitudinal axis of the pipe. The continuous fibers are individually bonded to the cured polymer matrix. The plurality of layers of helically wound continuous fibers embedded in a cured polymer matrix are wound as described above. The pressure resilient core pipe structure 11 further comprises an inner polymer layer 16 arranged directly inside and bonded to the embedded pressure armor structure 18. An innermost film layer 17 e.g. in the form of a wound metal layer e.g. with a thickness of 10 µm to 0.5 mm is applied inside and interfacially bonded to the inner polymer layer 16. The innermost film layer 17 is preferably arranged to provide the flexible pipe with an essentially smooth inner surface. The innermost film layer 17, the inner polymer layer 16 and the embedded pressure armor structure 18 form a bonded structure.

Between the pressure resilient core pipe structure 11 and the inner most tensile armor layer 12a, the flexible pipe preferably comprises a not shown anti-friction. Also between the pair of cross wound and non-bonded tensile armor layers 12a, 12b an anti-friction layer may advantageously be arranged.

Outside the pair of cross wound and non-bonded tensile armor layers 12a, 12b the flexible pipe comprises a helically wound thermal insulating layer 19 for example of thermal insulating elements as described in WO2013044920.

An outer protective sealing sheath 13 is arranged outside the thermal insulating layer 19.

Figure 3:
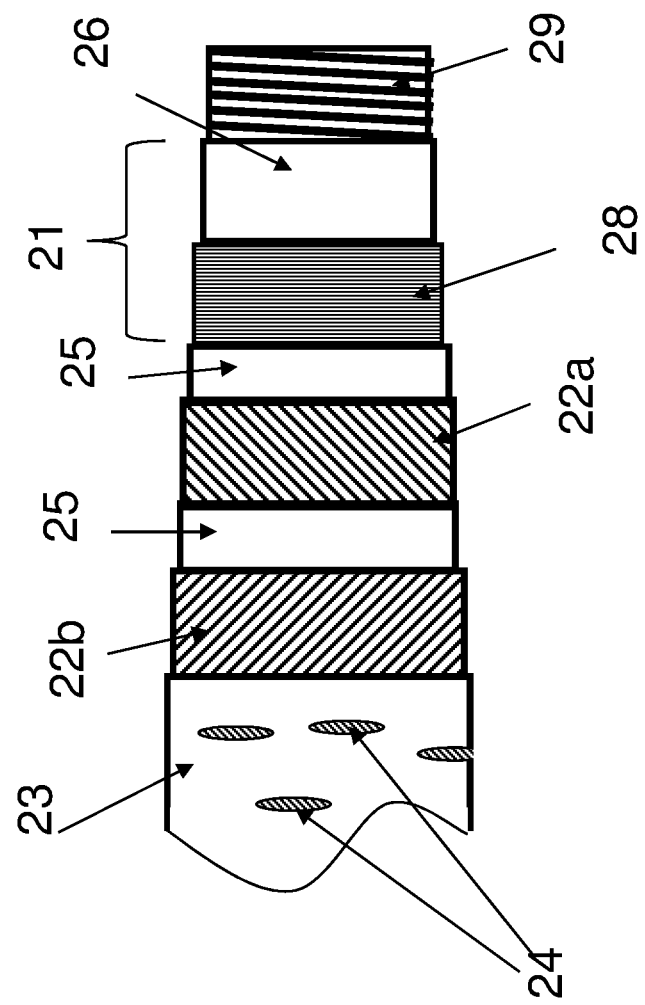
FIG. 3 is a schematic side view of a third embodiment of a flexible pipe of the invention.

The flexible pipe shown in FIG. 3 comprises a pressure resilient core pipe structure 21 and a pair of cross wound and non-bonded tensile armor layers 22a, 22b surrounding the core pipe structure 21. The pressure resilient core pipe structure comprises an embedded pressure armor structure 28 which comprises a plurality of layers of helically wound continuous fibers embedded in a cured polymer matrix. The pressure resilient core pipe structure 21 further comprises an inner polymer layer 26 providing an essentially smooth inner surface of the flexible pipe. The inner polymer layer 26 is arranged directly inside and bonded to the embedded pressure armor structure 28. The inner polymer layer 26 and the embedded pressure armor structure 28 form a bonded structure.

Inside the pressure resilient core pipe structure 21 the flexible pipe comprises a carcass 29. The carcass 29 is not bonded to the pressure resilient core pipe structure 21 but is preferably a carcass of the type usually applied in unbonded flexible pipes e.g. of helically wound and interlocked metallic armor elements, such as folded strips. Examples of suitable carcasses are described in co-pending application PCT/DK2014/050019.

Between the pressure resilient core pipe structure 21 and the inner most tensile armor layer 22*a*, the flexible pipe preferably comprises an anti-friction layer. Also between the pair of cross wound and non-bonded tensile armor layers 22*a*, 22*b* the pipe comprises an anti-friction layer 25.

Outside the pair of cross wound and non-bonded tensile armor layers 22*a*, 22*b* the flexible pipe comprises an outer protective sheath with a plurality of orifices for allowing water to come into contact with the pair of cross wound and non-bonded tensile armor layers 22*a*, 22*b*.

Figure 4:
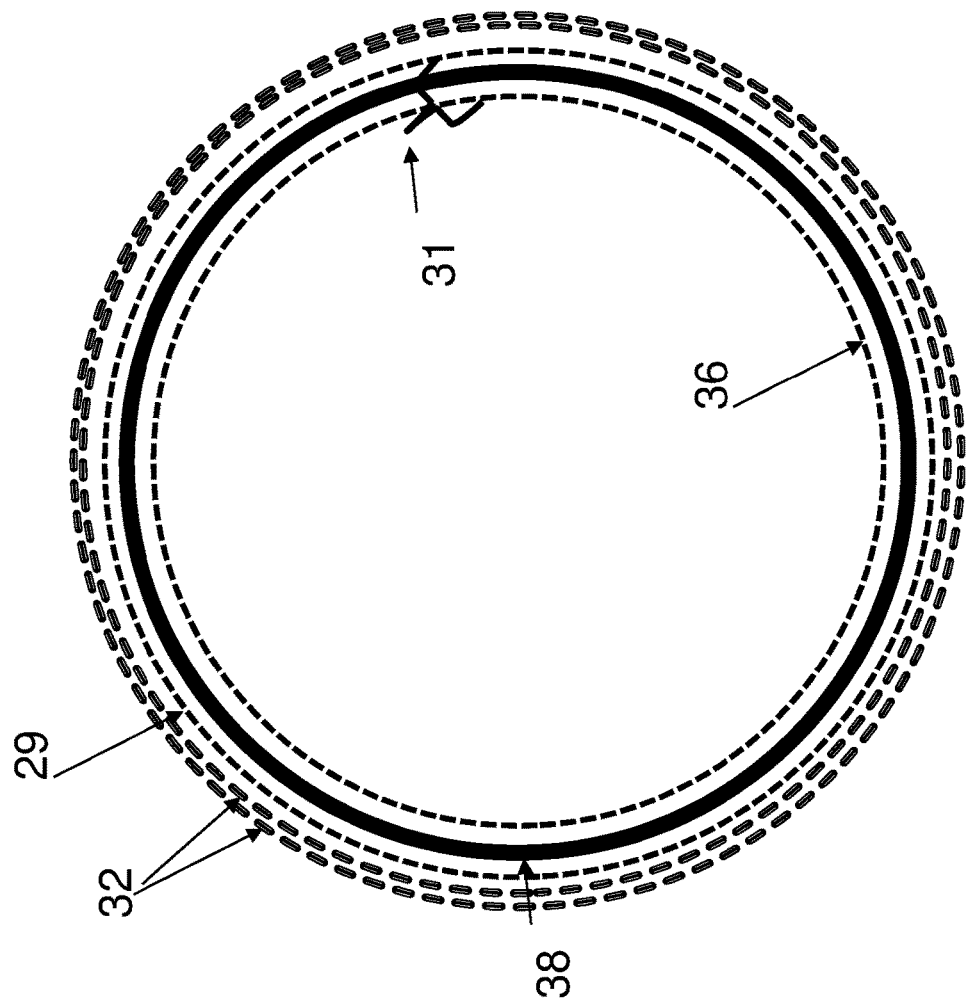
FIG. 4 is a schematic cross sectional view of a fourth embodiment of a flexible pipe of the invention.

The flexible pipe shown in FIG. 4 comprises a pressure resilient core pipe structure 31 and a pair of cross wound and non-bonded tensile armor layers 32 surrounding the core pipe structure 31. The pressure resilient core pipe structure comprises an embedded pressure armor structure 38 which comprises a plurality of layers of helically wound continuous fibers embedded in a cured polymer matrix. The pressure resilient core pipe structure 31 further comprises an inner polymer layer providing an essentially smooth inner surface 36 of the flexible pipe. The inner polymer layer is arranged directly inside and bonded to the embedded pressure armor structure 38.

Outside and bonded to the embedded pressure armor structure 38, the pressure resilient core pipe structure 31 comprises an outer polymer layer 39 providing an outer surface 39 of the pressure resilient core pipe structure 31.

FIG. 5 shows a flexible pipe under production where a layer of helically wound continuous fibers 48 has been wound to make part of an embedded pressure armor structure.

FIG. 6 shows a hybrid riser 50 of the invention arranged for transporting fluid between an upper facility 52 and a subsea facility 53. The upper facility comprises a collecting facility 52*a* which is arranged below the water line 54 and may for example be a mid water arch or another submerged facility. A vessel 52*b* floating at the water line 54 is connected to the collecting facility 52*a* via a jumper 55 which can for example be an unbonded flexible pipe with metal armor(s) and/or composite armor(s).

The riser 50 of the invention comprises at least three riser sections 50*a*, 50*b*, and 50*c*. Advantageously the uppermost riser section 50*a* is a metal armored riser section. The uppermost riser section is coupled to the lower riser section 50*b* as indicated with the coupling 51*a*. The lower riser section 50*b* is advantageously a composite armored riser section. In its lowermost end the lower riser section 50*b* is coupled to a lowermost riser section 50*c* as indicated with the coupling 51*b*. The lowermost riser section 50*c* is advantageously a metal armored riser section.

In should be understood that the riser can have any number of riser sections provided that it comprises at least one metal armored riser section and at least one composite armored riser section.

The lowermost riser section 50*c* of the riser is arranged to have a touch down point where it touch the seabed and lead further to the subsea facility 53. As explained above and as known by the skilled person, such touch down point will repeatedly be lifted from and laid back onto the seabed. The mechanical requirements to the lowermost riser section 50*c* are therefore high and it is generally desired that such riser section arranged to have a touch down point is a metal armored riser section.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

What is claimed is:

1. A flexible pipe having a longitudinal axis and comprising a pressure resilient core pipe structure with an inner surface defining a bore, and at least a pair of cross wound and non-bonded tensile armor layers surrounding said core pipe structure, said pressure resilient core pipe structure comprising an embedded pressure armor structure, wherein the embedded pressure armor structure comprises a plurality of layers of helically wound continuous fibers, wound with a winding angle of 60 degrees or more relative to the longitudinal axis of the pipe and embedded in a cured polymer matrix, wherein said fibers are individually bonded to the cured polymer matrix, and each of said layers of helically wound continuous fibers have a fiber density of at least 40%.

2. The flexible pipe of claim 1, wherein each of said layers of helically wound continuous fibers comprise a plurality of fibers, where each continuous fiber is wound adjacent to neighboring continuous fibers.

3. The flexible pipe claim 1, wherein at least two of said pluralities of layers of helically wound continuous fibers are embedded in a common layer of cured polymer matrix, said common layer of cured polymer matrix comprises all of said pluralities of layers of helically wound continuous fibers.

4. The flexible pipe of claim 1, wherein at least two of said pluralities of layers of helically wound continuous fibers are embedded in distinct layer of cured polymer matrix.

5. The flexible pipe of claim 1, wherein half of the plurality of layers of helically wound continuous fibers are helically wound in a first direction and the remaining of the layers of helically wound continuous fibers are helically wound in the opposite direction of the first direction.

6. The flexible pipe of claim 1, wherein the plurality of layers of helically wound continuous fibers are arranged in one or more stacks of contacting layers.

7. The flexible pipe of claim 1, wherein said continuous fibers are selected from the group consisting of: spun fibers from cut fibers, filaments, yarns, braided filaments, carbon fibers, glass fibers, basalt fibers, polymer fibers and combinations thereof.

8. The flexible pipe of claim 1, wherein the continuous fibers are polymer fibers selected from thermoset polymer fibers, such as epoxy fibers, polyester fibers, vinylester fibers, polyurethane fibers, phenolic fibers and thermoplastic polymer fibers, such as aramide fibers, polypropylene fibers, polyethylene fibers, polycarbonate fibers, thermoplastic polyester fibers and mixtures thereof.

9. The flexible pipe of claim 1, wherein the continuous fibers of the embedded pressure armor structure are impregnated with a polymer which is different from the cured polymer matrix in which the elongate armor elements are embedded.

10. The flexible pipe of claim 1, wherein the pressure resilient core pipe structure is a layered structure comprising an inner polymer layer and at least one outer layer surrounding the inner polymer layer.

11. The flexible pipe of claim 10, wherein the inner polymer layer is substantially free of said continuous fibers.

12. The flexible pipe of claim 10, wherein the inner polymer layer is of a substantially homogeneous polymer, selected among polyolefins, cross-linked polyolefins, not cross-linked polyolefins, for example polyethylene (PE) or polypropylene (PP); polyamides, for example polyamide 11 (PA-11) or polyamide 12 (PA-12); fluorinated polymers, for example polyvinylidene fluoride (PVDF); polysulfides, for example polyphenylene sulfide (PPS); polyurethanes (PU); polyesters; polyacetals; polyethers, for example polyethersulfone (PES), polyetheretherketone (PEEK) and rubbers such as butyl rubber and combinations thereof.

13. The flexible pipe of claim 1, wherein said pressure resilient core pipe structure comprises an outermost polymer layer in form of an anti-friction layer, such as a wound anti-friction layer.

14. The flexible pipe of claim 1, wherein the pressure resilient core pipe structure comprises at least one acidic neutralizing chemically active compound, in the form of a chemically active compound which can neutralize at least one of $CO_2$ and $H2S$, the chemically active compound is selected from ZnO, PbO, CuO, CdO, NiO, $SnO_2$ and $MoO_3$, cationic clay silicate, such as kaolinite; smectite; lllite; chlorite; and synthetic cationic clays and combinations thereof.

15. A method of producing a flexible pipe of claim 1, the method comprising providing a pressure resilient core pipe structure with an inner surface defining a bore and a longitudinal axis of the pipe, and winding at least a pair of cross wound and non-bonded tensile armor layers to surround said core pipe structure, wherein the production of said pressure resilient core pipe structure comprises providing at least one layer of a curable polymer matrix and winding a plurality of layers of continuous fibers with a winding angle of 60 degrees or more relative to the longitudinal axis of the pipe such that the individual continuous fibers are embedded in the curable polymer matrix and curing said curable polymer matrix, said curable polymer matrix being partly cured prior to winding of said continuous fibers.

16. The method of claim 15, wherein the method comprises winding said plurality of layers of continuous fibers one above the other.

17. The method of claim 15, wherein the method comprises winding said plurality of layers of continuous fibers to be embedded in said curable polymer matrix to ensure that each of said layers of helically wound continuous fibers have a fiber density of at least 40%.

18. The method of claim 15, wherein the method comprises impregnating said continuous fibers with a curable resin prior to winding.

19. The method of 15, wherein the method comprises applying a layer of bonding material prior to applying said curable polymer layer for increasing interfacial bonding between the cured polymer layer and an underlying layer.

20. A hybrid riser pipe for transporting fluid between an upper facility and a subsea facility, the riser has a center axis and a length along the center axis and comprises at least one unbonded flexible metal armored riser section and a composite pipe section, wherein the composite pipe section is a flexible pipe of claim 1.

* * * * *